Aug. 28, 1934.   R. E. SMITH   1,971,432
SPREADER
Filed Jan. 19, 1932   5 Sheets-Sheet 2
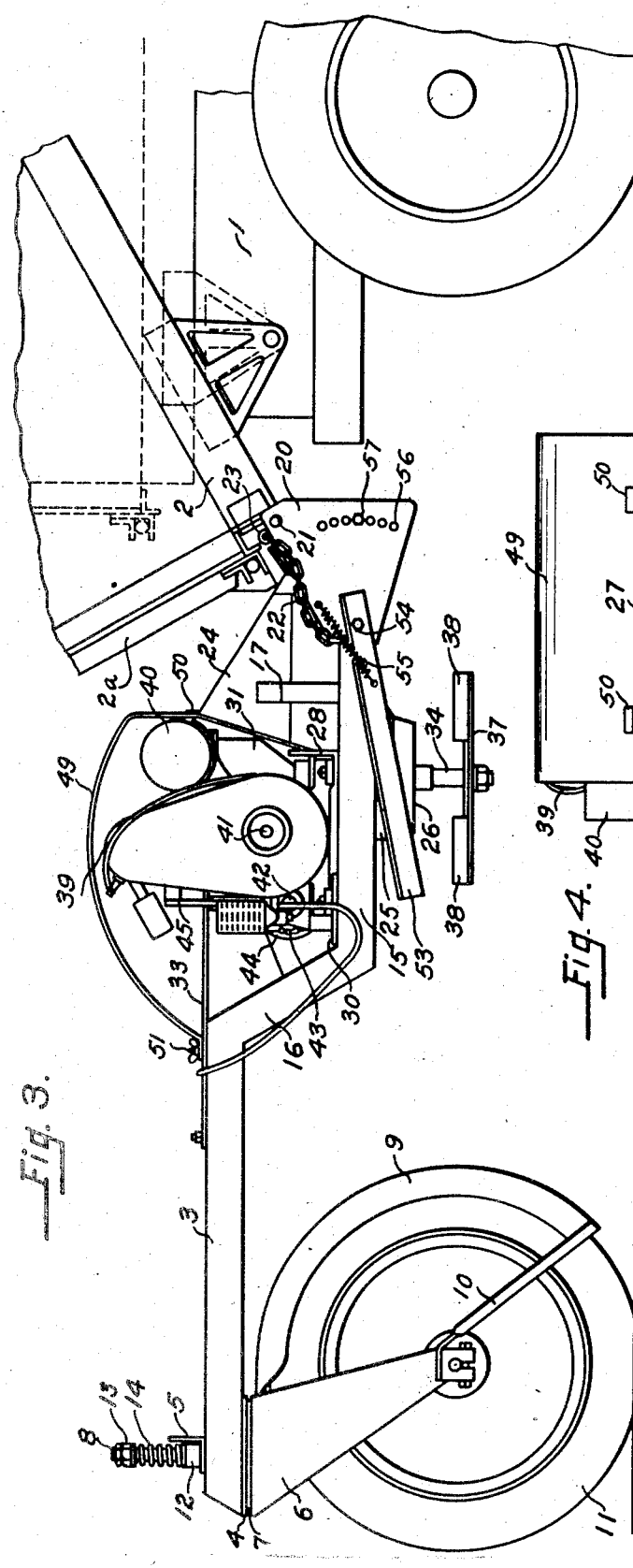
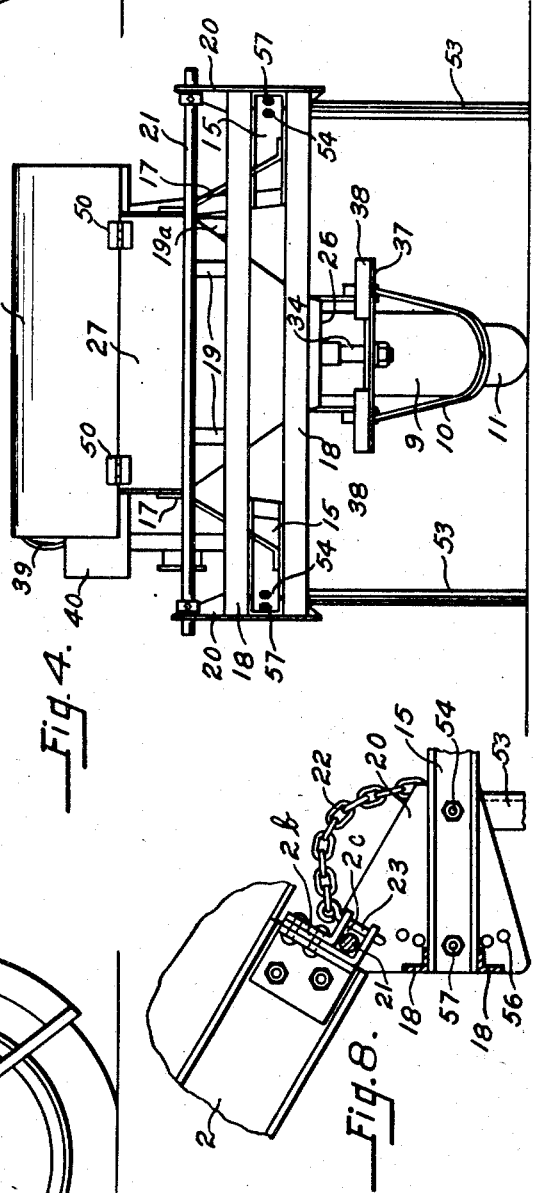
INVENTOR
RALPH E. SMITH.
BY Toulmin & Toulmin
ATTORNEY

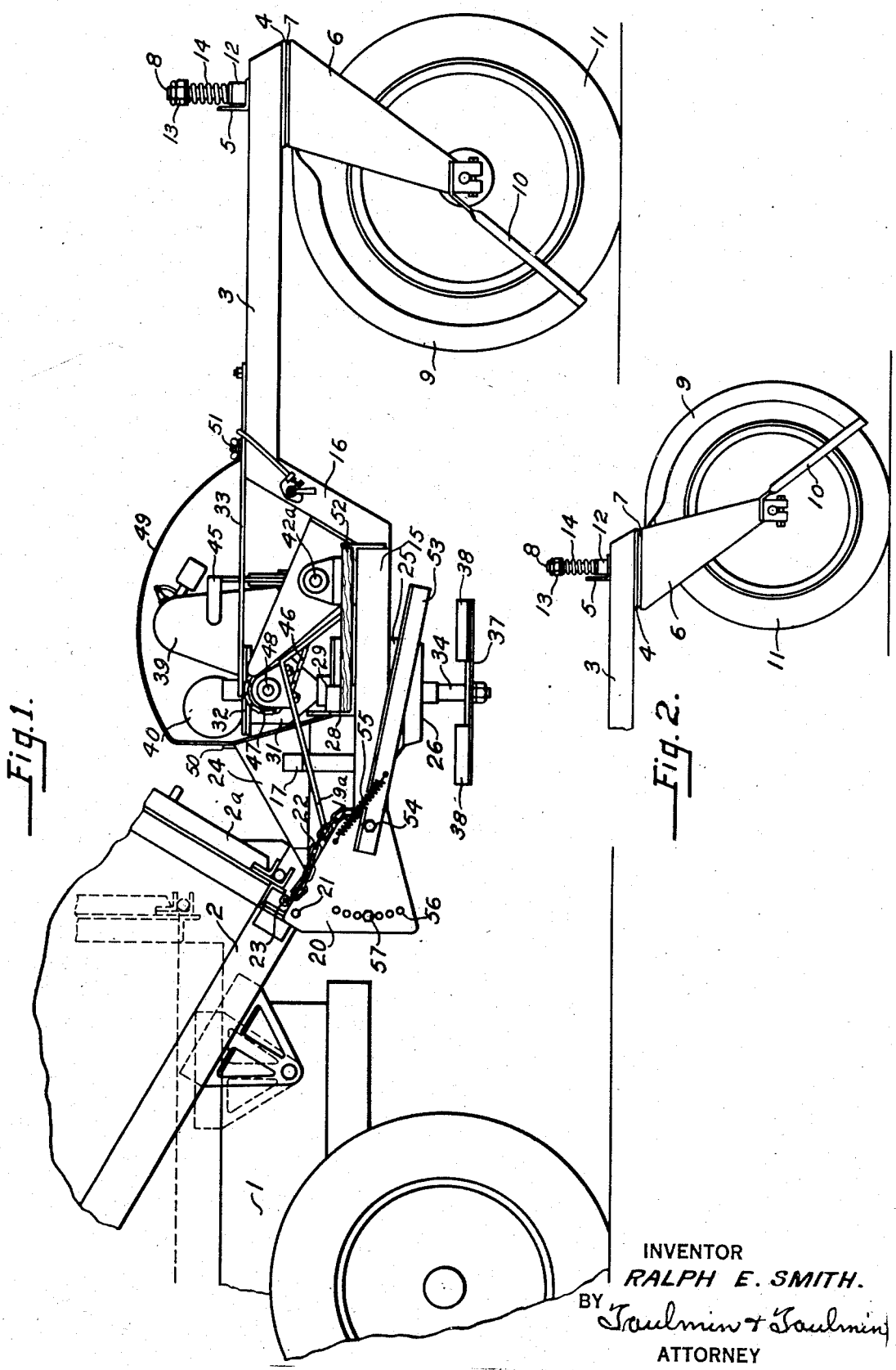

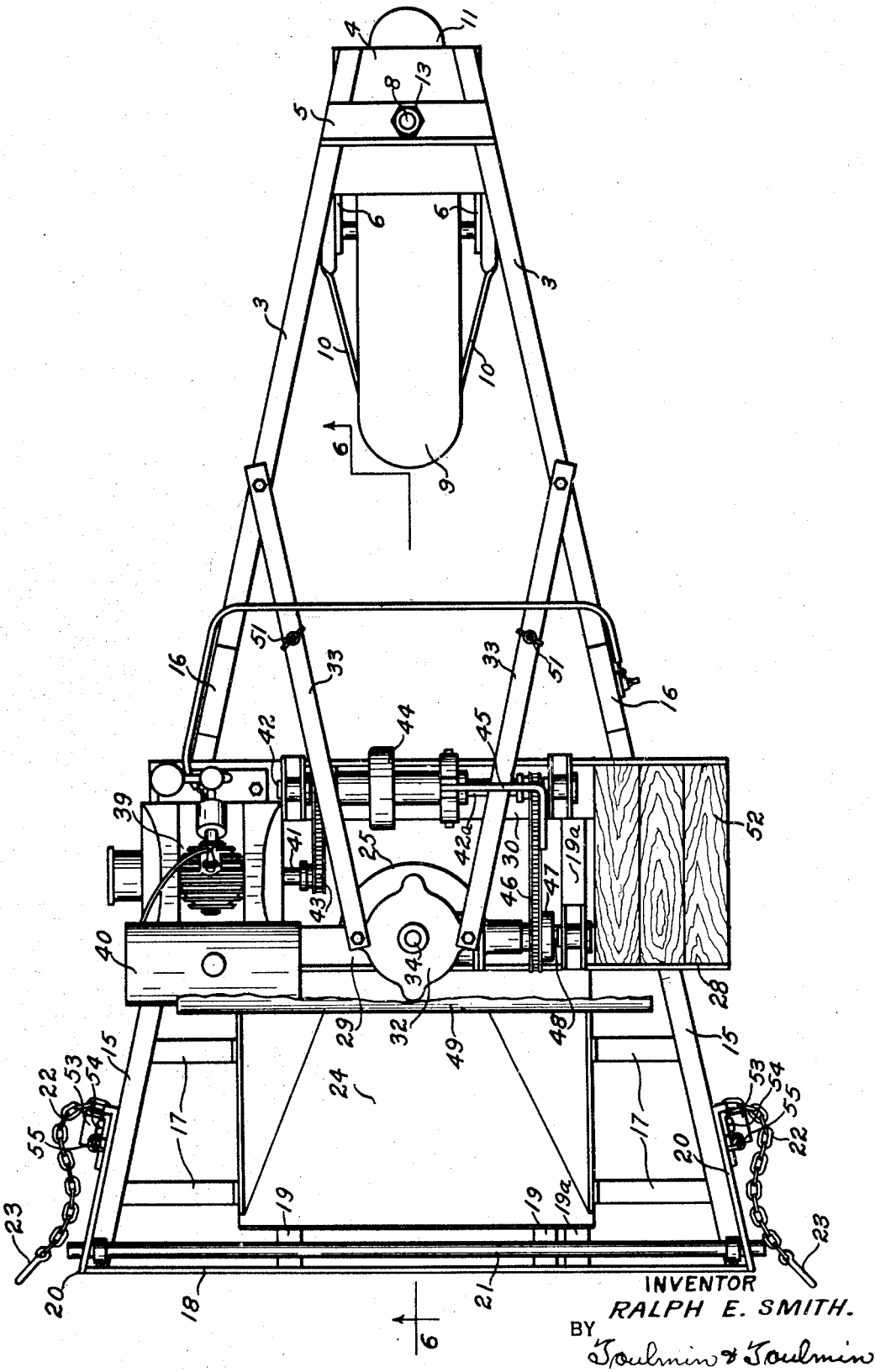

Aug. 28, 1934.  R. E. SMITH  1,971,432
SPREADER
Filed Jan. 19, 1932  5 Sheets-Sheet 4

INVENTOR
RALPH E. SMITH.
BY
Toulmin & Toulmin
ATTORNEY

Aug. 28, 1934.    R. E. SMITH    1,971,432
SPREADER
Filed Jan. 19, 1932    5 Sheets-Sheet 5
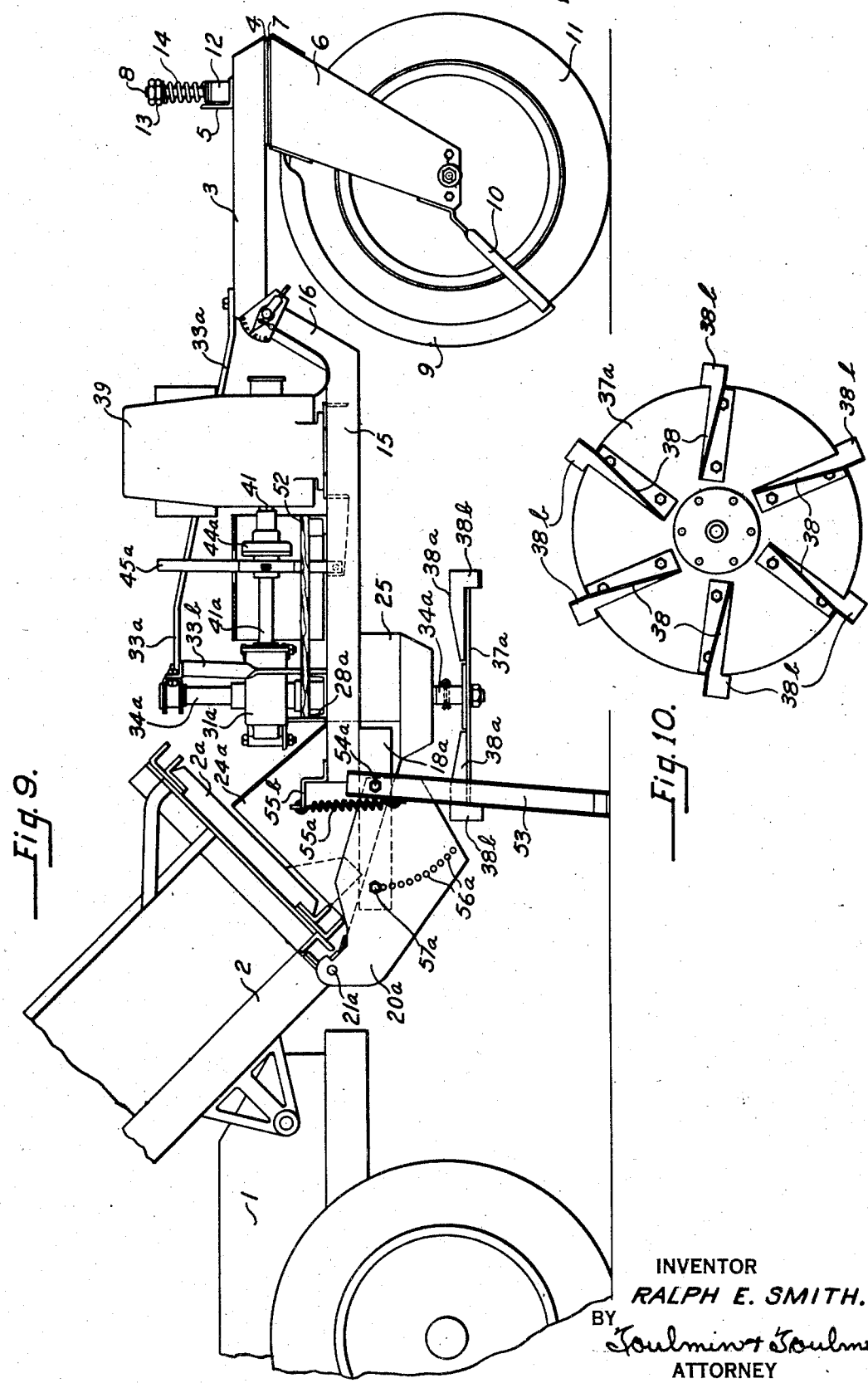
INVENTOR
*RALPH E. SMITH.*
BY
*Toulmin & Toulmin*
ATTORNEY Patented Aug. 28, 1934

1,971,432

UNITED STATES PATENT OFFICE 1,971,432

SPREADER

Ralph E. Smith, Galion, Ohio, assignor to The Galion Metallic Vault Company, Galion, Ohio, a corporation of Ohio Application January 19, 1932, Serial No. 587,548

25 Claims. (Cl. 275—8)

This invention relates to spreaders, and has for its object to provide a spreading attachment adapted to be used in connection with a container for various materials, such as crushed rock, gravel, sand, fertilizer and any other similar material.

It is particularly the object of this invention to provide a spreader adapted to be used in connection with dump trucks, and similar means of transportation, so that the material may be dumped from the body of the truck into a hopper forming part of the spreader, and the material spread by suitable apparatus associated with and operated by an operating means connected to and supported by the spreader.

It is also the object of this invention to provide a spreader consisting of a hopper and suitable operating mechanism, partly supported by a wheel support and in addition thereto supported by some suitable part of a dump truck or source of material to be distributed or spread.

By having a self-contained detachable trailer on a swiveled caster wheel the truck may either push or pull the trailer, and the trailer can be attached to a succession of trucks as the trucks go to and fro from a source of supply, and then use the distribution trailer of this invention to distribute the material from the dump body of the truck in an even layer over the roadway, or other area on which the spreading is being done.

The man operating the spreader stands on a platform which is convenient for his regulating the amount of material leaving the tail gate of the dump body of the truck entering the hopper.

These and other advantages will appear from the following description taken in connection with the drawings.

Referring to the drawings:

Figure 1 is a view showing the lefthand side of the spreader attached to one end of a dump truck, a fragment of which is shown for purposes of illustration.

Figure 2 is a view of the wheel support for the spreader with the wheel in a position the reverse of that shown in Figure 1.

Figure 3 is a view similar to Figure 1, but showing the righthand side of the spreader attached to the rear of a dump truck.

Figure 4 is a front elevation of the spreader detached from the dump truck.

Figure 5 is a top plan view of the spreader with the guard broken away to show the operating machinery protected by the guard.

Figure 8 is a view showing one corner of the rear of the truck body showing one of the brackets for attaching the spreader to the rear of the dump truck.

Figure 9 is a side elevation of a spreader in which there is a gear drive connection between the motor shaft and the spreader shaft.

Figure 10 is a top plan view of a modified form of a spreader disk.

Figure 6:
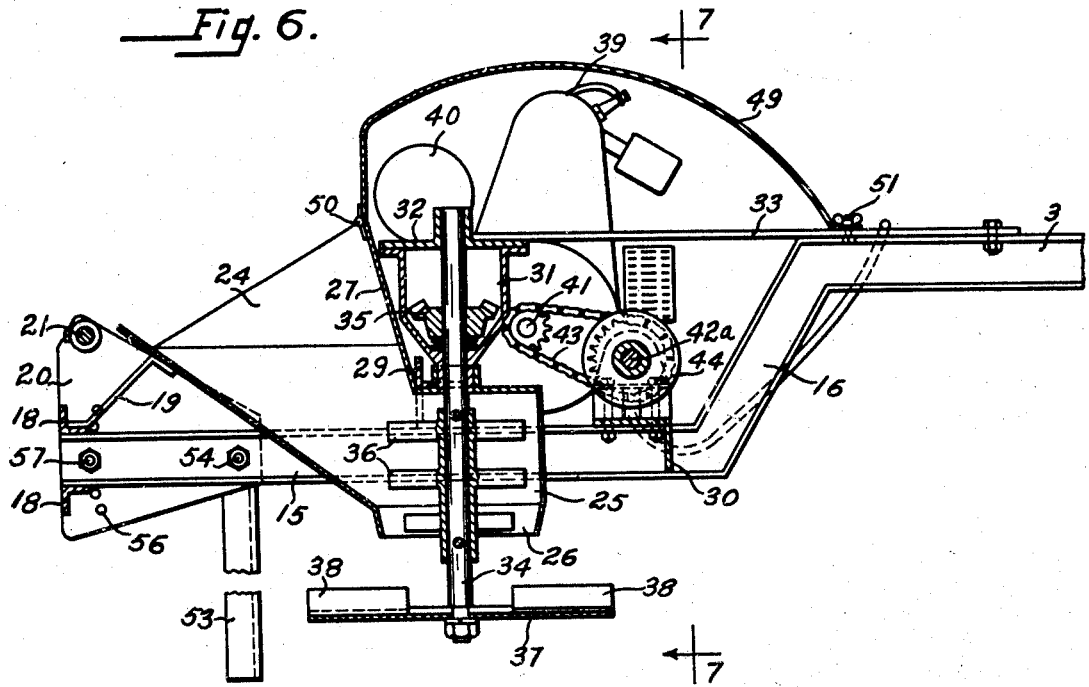
Figure 6 is a section on the line 6—6 of Figure 5.

While the spreader is here shown used in connection with a dump truck, it may be used in connection with other vehicles for receiving and spreading materials. In the present embodiment of the invention the spreader is shown used in connection with a dump truck, the frame of which is indicated by the numeral 1, and which has pivotally attached to the rear end thereof a dump body 2, with a swing tail gate 2a to control the exit of material to the hopper of the trailer below it. This dump body has on each side, below the rear door, a pair of spaced angle irons 2b attached to the body in any suitable manner by welding, or by rivets or bolts, and forming a space 2c, the purpose of which will be later described.

The spreader has a frame composed of a pair of forwardly diverging beams, the rear part of each beam being indicated by the numeral 3. The rear ends of these beams approach each other but do not come together, as is clearly shown in Figure 5, and are held slightly spaced by means of a lower plate 4 and an upper bar 5, which may be welded or attached to the beams in any suitable manner.

Beneath the plate 4 is a pair of downwardly extending legs 6, which have on their upper ends an integral plate 7. This plate supports the plate 4 and forms a bearing for the plate 4 in supporting the rear ends of the beams. These plates 4, 7 and bar 5 are pivoted together by means of a bolt 8.

Extending from the plate 7 and around and arcuate therefrom is a fender 9, which has its free end connected to the lower ends of the legs 6 by means of arms 10. Between the legs 6 and the arms 10 is a wheel 11, the axles of which are supported in the lower ends of the legs 6 for supporting the rear end of the frame formed from the beams 3.

Immediately above the bar 5 and fitting over the bolt 8 is a washer 12. Between this washer and a nut 13 on the upper end of the bolt is a spring 14. This spring reduces the friction between plates 4 and 7 and keeps the wheel from whipping or shimmying when the truck is traveling at a high rate of speed or over rough roads. This wheel forms a support for the rear of the spreader. The support for the front of the spreader is the truck, or other transporting vehicle from which the material spread is fed into a hopper forming part of the spreader.

The front parts of the beams forming the frame are indicated by the numeral 15. These front parts of the beams are connected to the parts 3 by means of upwardly and rearwardly extending intermediate parts 16. This formation of the frame from beams of this kind affords a frame of which the rear is relatively high compared with the front part. The parts of the beams 15 form a support for the operating mechanism of the spreader.

Extending inwardly and upwardly from each part 15 of the longitudinal beams are braces 17 for a hopper 24. In the present instance there are two of these braces on each side. The extreme front ends of the beams are united by means of an end bar 18 attached thereto in any suitable and convenient manner. Extending rearwardly and upwardly from the end bar 18 to the front of the hopper is a plurality of braces 19. The braces 17 and 19 serve as positioning and supporting means for the hopper. The numeral 19a indicates a support for the bearing in which the shaft 48 rotates.

On each side at the front of the frame, is a plate 20 pivoted to the beams. In the upper front end of these plates is a cross rod 21. This cross rod is for the purpose of attaching the front of the spreader to the rear of the dump body. This rod extends into the space 2c formed by the angle irons 2b, and is fastened in the space 2c by means of pins 23 attached to chains 22. Each chain has on one end a pin, while its other end is suitably attached to a plate 20, or to some suitable part of the frame adjacent the cross rod 21.

Supported on the front end of the frame adjacent the cross rod 21 is the hopper 24. This hopper is shown in plan in Figure 5, and in longitudinal section in Figure 6, and inclines rearwardly and downwardly and terminates in a chamber 25, which has in the lower end thereof an outlet 26 for the discharge of material from the hopper after it has been discharged from the dump body into the hopper. The back of the hopper is indicated by the numeral 27 and serves to direct the material dumped into the hopper into the chamber 25. This back of the hopper also serves as a protector for operating mechanism used for distributing the material that passes from the hopper, through the outlet 26.

Immediately above the chamber 25 and transverse of the frame, and supported by the beams is a cross beam 28, which has in its center, between the two beams forming the frame, an arched part 29. To the rear of the cross beam 28 is a second cross beam 30, also supported at its ends by the beams forming the main frame of the spreader. Immediately above the chamber 25 and supported by the arched part 29 of the cross beam 28 is a gear housing 31, closed at its top by means of a plate 32.

Extending from each side of the plate 32 rearwardly is a brace 33. One end of each of these braces is attached to the plate 32, while its other end is attached to the part 3 of the longitudinal beam. Extending upwardly through the chamber 25 and through the gear housing 31 is a shaft 34, the upper end of which is supported in a bearing in the central part of the plate 32. On this shaft within the gear housing 31 is a gear 35, supported on the bottom of the gear housing 31. This shaft extends downwardly through the chamber 25, out at the opening or outlet 26, and has thereon intermediate its ends, arms 36 which rotate within the chamber 25 for agitating and loosening the material within the chamber so it may be easily discharged from the hopper through the outlet 26.

On the lower end of this shaft and beneath the outlet 26 is a disc 37, attached thereto in any suitable manner so it will rotate with the shaft. On the upper surface of this disc are radially extending vanes 38. These vanes are arranged so that when the material passes from the hopper, through the outlet 26, it will be radially discharged from the disc and scattered in all directions, so that as the dump truck and the spreader move an equal distribution of the material being spread will be made over a certain radius on a road being graveled or a field being fertilized.

Supported on one side of the frame is a motor 39 suitably attached to the frame and the tank, which has connected thereto a convenient tank 40 for supplying gasoline. In the present instance the motor is a gasoline motor and is used for operating the shaft 34. This motor has a shaft 41, which is connected to a transverse shaft 42 by means of a sprocket chain 43. This sprocket chain engages sprocket wheels, one on the motor shaft and the other on one end of a part 42 of a two-part shaft so that when the motor shaft rotates the part 42 will rotate with it. The other part of this shaft is indicated by the reference character 42a.

The two-part shaft is to the rear of the motor and has thereon a clutch member 44 of the dry disc type, by means of which the two parts are connected for joint rotation by the sprocket chain 43. The clutch 44 is operated by means of a clutch lever 45, which is suitably pivoted to some part of the frame and extends upwardly and to one side for manipulation by an operator, who stands on a platform, hereinafter to be described.

There is also fixed to the part 42a of the two-part shaft a sprocket wheel which operates a sprocket chain 46 for rotating a sprocket wheel 47 fixed to a shaft 48. This shaft is located transverse of the frame and supported adjacent the gear housing 31, and has a gear connection with the gear 35 located within the gear housing 31.

To the upper edge of the back part 27 of the hopper a guard 49 is pivoted by means of hinges 50. This guard extends upwardly and rearwardly over the motor and other operating mechanism supported by the frame. This guard is attached to the parts 3 of the frame by means of screws 51. These screws permit the ready removal of this guard so it can be tilted back for inspection, cleaning and other operations upon the machinery.

Figure 7:
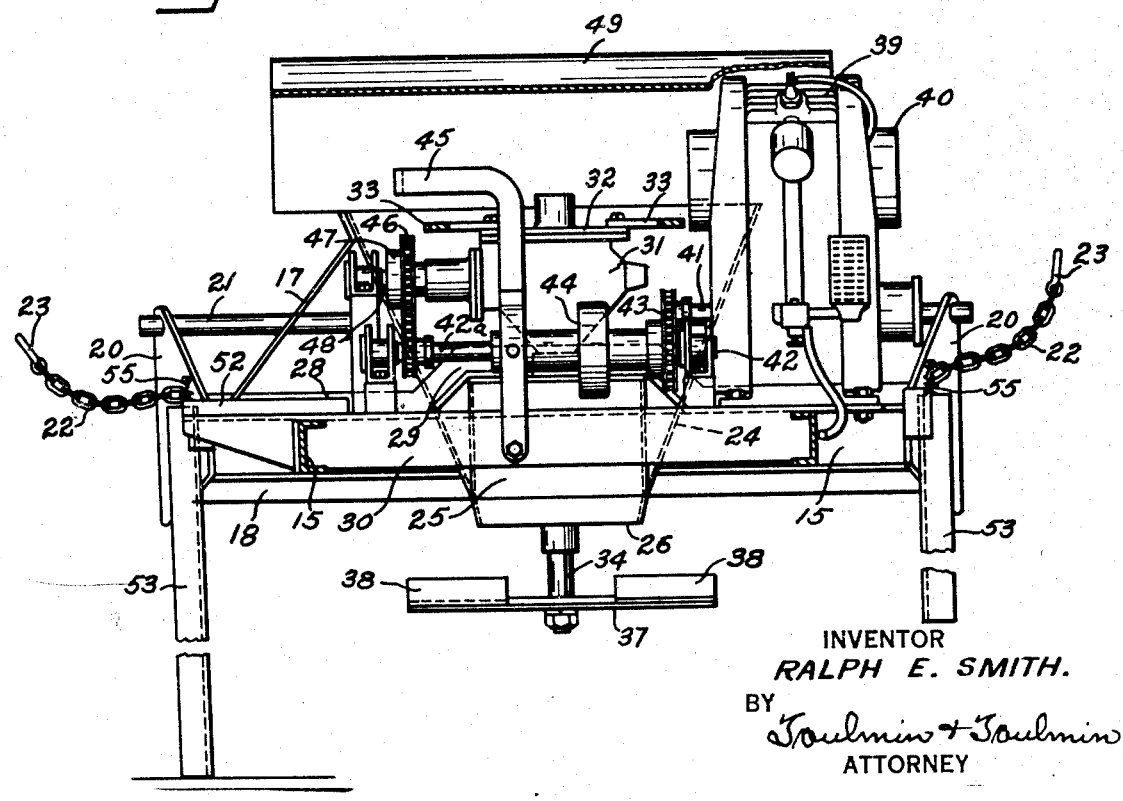
Figure 7 is a section on the line 7—7 of Figure 6.

Located on one side of the frame is a platform 52. As shown in Figures 5 and 7, this platform is located on the left-hand side of the frame adjacent the operating mechanism, and so that the clutch lever 45 may be operated by an operator located on this platform.

In order to support the front end of the spreader when it is not attached to a truck or some other vehicle, legs 53 are provided. These legs are pivoted to the beams by means of bolts or pins 54, which serve as pivots for the plates 20. These legs are held in inoperative position, as shown in Figures 1 and 3, by means of springs 55. One end of each spring is attached to a leg, while the other end is attached to one of the plates 20, or some other suitable part of the frame structure.

When it is desired to support the front end of the spreader on the legs they are pulled down against the operation of the spring to the position shown in Figure 7. The rear ends of the plates 20 have a series of holes 56, by means of which the plates can be adjustably attached to the front end of the frame by means of the bolts 57. These bolts 57 extend through certain of the holes 56, into the beams of the parts 15 of the frame.

In operation the spreader is attached to the rear end of a truck, as shown in Figures 1 and 3. When the spreader is in this position any material to be spread is dumped from the body of the truck into the hopper of the spreader. In the hopper the material passes back into the chamber 25 and out through the outlet 26. In order that the material may not clog the outlet 26 arms 36 are provided. As the material passes out at the outlet it is caught by the disk 37, which by its rotation tends to spread and evenly distribute the material over the surface traversed by the dump truck and also by the spreader.

The operation of the machinery part of the spreader is manipulated by a person standing on the platform at one side of the spreader. In this position the clutch lever 45 may be operated for starting or stopping the operation of the disk 37, with the vanes 38 therein. It is understood that the motor for furnishing power for the spreader is running, and motion from the motor to the disk 37 may be controlled by means of the clutch 44 and the clutch lever 45.

In Figure 9 there is shown a spreader in which there is a more direct drive between the motor and the spreader shaft. The main parts of the spreading apparatus shown in this figure are similar to those shown in the other figures. Suitably attached to each side beam 15 is a plate 18a which extends forward from the beam. To each of these plates is attached a plate 20 so that it may move in a vertical plan about a pivot 54a that supports the leg 53. In the front ends of these plates is a rod 21a by which the spreader is attached to the rear of the dump truck body. Supported by the plates 18a is a hopper 24a similar to the hopper 24 shown in the other figures.

Extending transversely of the frame formed by the side bars 15 is a bar 28a which serves to support a gear housing 31a for enclosing the gears on the spreader shaft 34a and the motor shaft 41a. Extending from one of the parts 3 forward to the upper end of the vertical shaft 34a is a brace bar 33a. This bar has extending from it adjacent the upper end of the vertical shaft 34a toward each side of the frame a bar 33b. This bar is attached at its middle point to the front end of the bar 33a and at its ends to the transverse bar 28a. The motor shaft is in two sections adapted to be united to each other by means of a clutch 44a.

The spreader disk is indicated by the numeral 37a and is similar to the disk shown in the other figures. This disk has radially extending vanes 38a that are slightly inclined to the vertical. Each of these vanes has on its outer end, extending beyond the periphery of the disk, a flat extension 38b. These vanes are thus shaped to properly distribute the material being spread. At the junction between the bars 33a and 33b, a bearing is formed for the upper end of the vertical or spreader shaft. In order that the plates 20a may be held in adjusted position, holes 56a are provided therein through which a pin 57a passes into a similar hole in the front end of plate 18a.

I desire to comprehend within my invention such modifications as may be embraced within my claims and the scope of my invention.

Having thus fully described my invention, what I claim as new and desire to secure by Letters Patent, is:

1. In a spreading apparatus, in combination with a dump body, a hopper adapted to be attached to and supported by the dump body and receive material discharged from the body, said hopper having a discharge opening, a shaft in said hopper extending through the opening, power means supported adjacent the hopper to rotate the shaft, and means on the shaft to agitate the material in the hopper.

2. In a spreading apparatus, in combination with a dump body, a hopper adapted to be attached to and supported by the dump body and receive material discharged from the body, said hopper having a discharge opening, a shaft in said hopper extending through the opening, a motor supported adjacent the hopper to rotate the shaft, and means on the shaft to spread the material leaving the hopper.

3. In a spreading apparatus, in combination with a dump body, a hopper adapted to be attached to and supported by the dump body and receive material discharged from the body, said hopper having a discharge opening, a shaft in said hopper extending through the opening, a motor supported adjacent the hopper to rotate the shaft, and means on the shaft to spread the material leaving the hopper, said means including a disc.

4. In a spreading apparatus, in combination with a dump body, a hopper adapted to be attached to and supported by the dump body and receive material discharged from the body, said hopper having a discharge opening, a shaft in said hopper extending through the opening, a motor supported adjacent the hopper to rotate the shaft, and means on the shaft to spread the material leaving the hopper, said means comprising a disc having radiating vanes thereon.

5. In a spreading apparatus, in combination with a dump body, a hopper, means for attaching the hopper to each side of the rear end of said body for receiving material discharged from the body, said hopper having a discharge opening in the bottom thereof, a motor, and means operated by the motor for spreading the material as it passes through said opening.

6. In a spreading apparatus, in combination with a dump body, a hopper having a roller support, means for pivotally attaching the hopper to each side of the rear of the dump body so that material may be dumped from the body into the hopper and the hopper may be transported on its roller support by the body, and means attached to the hopper for discharging the material from the hopper.

7. In a spreading apparatus, in combination with a dump body, a hopper having a roller support, means for pivotally attaching the hopper to the rear of the dump body so that material may be dumped from the body into the hopper and the hopper may be transported on its roller support by the body, and means for discharging the material from the hopper and spreading the material as discharged.

8. In a spreading apparatus, in combination with a dump body, a hopper having a roller support, means for attaching the hopper to the dump body so that material may be dumped from the body into the hopper, a motor, and means operated by the motor for discharging the material from the hopper and spreading the material.

9. In a spreading apparatus, in combination with a dump body, a hopper having a roller support, means for attaching the hopper to the dump body so that material may be dumped from the body into the hopper, a motor, and means operated by the motor for discharging the material from the hopper and spreading the material, said means including a shaft having radiating vanes thereon.

10. In a spreading apparatus, in combination with a dump body, a hopper having a roller support, means for attaching the hopper to the dump body so that material may be dumped from the body into the hopper, a motor, and means operated by the motor for discharging the material from the hopper and spreading the material, said means including a shaft having thereon radiating arms and a disc.

11. In a spreading apparatus, in combination with a vehicle having a body, a frame adapted to be attached at one end to each side of the body, means to adjustably attach the frame to the body, a roller support for the other end of the frame, a hopper on the frame for receiving material from the body, and means beneath the hopper for spreading material.

12. In a spreading apparatus, in combination with a vehicle having a body, a frame attached at one end to each side of the body, a wheel support for the other end of the frame, a hopper on the frame having an outlet, a motor on said frame, and means operated by the motor for spreading material leaving the hopper through the outlet.

13. In a spreading apparatus, in combination with a body, a frame attached at one end to each side of the body, a wheel support for the other end of the frame, a hopper on the frame, spreading means supported beneath the hopper, a motor, and means for operatively connecting the spreading means to and disconnecting it from the motor.

14. In combination, in a trailer spreader of a supporting frame, a wheel at one end attaching means at the other end, a hopper on the frame adjacent thereto, spreader means supported by the frame and adapted to receive material from the hopper and spread it, and power means on said frame for operating said spreader means.

15. The combination, in a trailer spreader of a supporting frame, a wheel at one end, adjustable attaching means pivoted to the other end, a hopper on the frame adjacent thereto, spreader means on the frame adapted to receive material from the hopper and spread it, power means on said frame for operating said spreader means, and means pivoted to the pivot of the attaching means to support the hopper end of the trailer when inoperative comprising swinging legs.

16. The combination, in a trailer spreader of a supporting frame, a wheel at one end, adjustable attaching means pivoted on the other end, a hopper on the frame adjacent thereto, spreader means on the frame adapted to receive material from the hopper and spread it, power means on said frame for operating said spreader means, means pivoted to the pivot of the attaching means to support the hopper end of the trailer when inoperative comprising swinging legs, and yielding means for maintaining said legs in inoperative position while the trailer is being operated.

17. In combination, in a trailer spreader, a frame, a caster wheel at one end thereof, means to attach the other end of the trailer frame to another vehicle, a hopper on the frame, a spreader beneath the hopper, a stirrer associated with the spreader, and power means on the frame for operating the stirrer and the spreader.

18. In combination, a truck having a pivoted dump body, a trailer attached to the rear end of the dump body pivotally, a tail gate on said dump body for regulating the exit of material therefrom, a hopper on the trailer for receiving the material from the dump body as it dumps, and a wheel support at the other end of the trailer.

19. In combination, a truck having a pivoted dump body, a trailer attached to the rear end of the dump body pivotally, a tail gate on said dump body for regulating the exit of material therefrom, a hopper on the trailer for receiving material from the dump body as it dumps, a wheel support at the other end of the trailer, a spreader beneath said hopper for receiving material therefrom and spreading it.

20. In combination, a truck having a pivoted dump body, a trailer attached to the rear end of the dump body pivotally, a tail gate on said dump body for regulating the exit of material therefrom, a hopper on the trailer for receiving material from the dump body as it dumps, a wheel support at the other end of the trailer, a spreader beneath said hopper for receiving material therefrom and spreading it, a platform on said trailer on which an operator can stand, a source of power for operating said spreader, and means for controlling said source of power adjacent said platform, said platform being arranged adjacent the tail gate for operation thereof by the operator on the platform.

21. In combination, a pivoted dump body on a truck, a trailer detachably attached to the rear end of said dump body, a hopper on the trailer adapted to receive material from the dump body when it is dumped, a spreader beneath the hopper, power means on the trailer for operating the spreader, and a caster wheel supporting the free end of the trailer.

22. In combination, a pivoted dump body on a truck, a trailer detachably attached to the rear end of said dump body, a hopper on the trailer adapted to receive material from the dump body when it is dumped, a spreader beneath the hopper, power means on the trailer for operating the spreader, a caster wheel supporting the free end of the trailer, and means to adjustably position and attach said trailer with respect to said dump body.

23. In a spreader trailer, the combination of a triangular frame having one portion at a lower level than the other, a caster wheel pivoted on the free end of the upper portion, a hopper, power means, a stirrer carried on the lower portion of the frame, and means to detachably attach the lower portion of the frame to a dump body.

24. In a spreader trailer, the combination of a triangular frame having one portion at a lower level than the other, a caster wheel pivoted on the free end of the upper portion, a hopper, power means, a stirrer carried on the lower portion of the frame, means to detachably attach the lower portion of the frame to a dump body, and a platform carried adjacent said hopper and power mechanism above said spreader on the depressed portion of the frame.

25. In combination in a trailer spreader, a triangular frame body having a caster wheel at one end and detachably attaching means at the other end, a hopper, spreader and power means for operating the spreader over the hopper to one side thereof.

RALPH E. SMITH.